US008688910B2

(12) United States Patent
Moyer

(10) Patent No.: US 8,688,910 B2
(45) Date of Patent: Apr. 1, 2014

(54) DEBUG CONTROL FOR SNOOP OPERATIONS IN A MULTIPROCESSOR SYSTEM AND METHOD THEREOF

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 700 days.

(21) Appl. No.: 12/366,985

(22) Filed: Feb. 6, 2009

(65) Prior Publication Data
US 2010/0205377 A1    Aug. 12, 2010

(51) Int. Cl.
G06F 12/00    (2006.01)
G06F 9/44     (2006.01)

(52) U.S. Cl.
USPC .................. 711/118; 711/146; 711/E12.017; 717/124

(58) Field of Classification Search
USPC ................................... 711/118, 146; 717/124
See application file for complete search history.

(56) References Cited

U.S. PATENT DOCUMENTS

| 5,355,471 A | 10/1994 | Weight |
| 5,426,765 A | 6/1995 | Stevens et al. |
| 5,636,363 A | 6/1997 | Bourekas et al. |
| 5,652,859 A | 7/1997 | Mulla et al. |
| 5,893,151 A | 4/1999 | Merchant |
| 5,920,892 A | 7/1999 | Nguyen |
| 6,029,204 A | 2/2000 | Arimilli et al. |
| 6,073,212 A | 6/2000 | Hayes et al. |
| 6,175,930 B1 | 1/2001 | Arimilli et al. |
| 6,253,291 B1 | 6/2001 | Pong et al. |
| 6,668,309 B2 | 12/2003 | Bachand et al. |
| 6,754,856 B2 | 6/2004 | Cofler et al. |
| 6,907,502 B2 | 6/2005 | Augsburg et al. |
| 6,925,634 B2 | 8/2005 | Hunter et al. |
| 6,990,657 B2 | 1/2006 | Hunter et al. |
| 7,039,901 B2 | 5/2006 | Hunter et al. |
| 7,096,385 B1 | 8/2006 | Fant et al. |
| 7,665,002 B1 * | 2/2010 | White et al. .................. 714/733 |

(Continued)

FOREIGN PATENT DOCUMENTS

WO    9932976    7/1999

OTHER PUBLICATIONS

Moyer, W.C., "Debug Control for Snoop Operations in a Multiprocessor System and Method Thereof", U.S. Appl. No. 12/366,994, Office Action, Non-Final Rejection, filed Feb. 6, 2009.
U.S. Appl. No. 12/201,225, filed Aug. 29, 2008.

(Continued)

*Primary Examiner* — Reginald Bragdon
*Assistant Examiner* — Aracelis Ruiz
(74) *Attorney, Agent, or Firm* — Joanna G. Chiu

(57) ABSTRACT

A data processing system has a cache which receives both non-debug snoop requests and debug snoop requests for processing. The non-debug snoop requests are generated in response to transactions snooped from a system interconnect. Debug control circuitry that is coupled to the cache provides the debug snoop requests to the cache for processing. The debug snoop requests are generated in response to debug snoop commands from a debugger and without the use of the system interconnect. In one form snoop circuitry has a snoop request queue having a plurality of entries, each entry for storing a snoop request. A debug indicator corresponding to each snoop request indicates whether the snoop request is a debug snoop request or a non-debug snoop request.

18 Claims, 5 Drawing Sheets

(56) References Cited

U.S. PATENT DOCUMENTS

| | | | |
|---|---|---|---|
| 2002/0100019 A1 | 7/2002 | Hunter et al. | |
| 2003/0005236 A1 | 1/2003 | Arimilli et al. | |
| 2004/0068623 A1* | 4/2004 | Augsburg et al. | 711/146 |
| 2006/0253737 A1 | 11/2006 | Ueda | |
| 2007/0006042 A1 | 1/2007 | Beukema et al. | |
| 2008/0288725 A1* | 11/2008 | Moyer et al. | 711/146 |
| 2009/0006764 A1 | 1/2009 | Blumrich et al. | |

OTHER PUBLICATIONS

U.S. Appl. No. 12/201,228, filed Aug. 29, 2008.
U.S. Appl. No. 12/201,272, filed Aug. 29, 2008.
U.S. Appl. No. 12/201,216, filed Aug. 29, 2008.
U.S. Appl. No. 12/112,796, filed Aug. 30, 2008.
U.S. Appl. No. 11/969,112, filed Jan. 3, 2008.
U.S. Appl. No. 12/053,761, filed Mar. 24, 2008.

* cited by examiner

| WAIT FOR TRIGGER | BUFFER | GO | SNOOP COMMAND | SNOOP ID |
|---|---|---|---|---|

FIG. 5

| 7 | 6 | 5 | 4 | 3 | 2 | 1 | 0 |
|---|---|---|---|---|---|---|---|

FIG. 6

DEBUG CONTROL FOR SNOOP OPERATIONS IN A MULTIPROCESSOR SYSTEM AND METHOD THEREOF

RELATED APPLICATION

The present invention relates to a co-pending application Ser. No. 12/366,994 entitled "Method for Debugger Initiated Coherency Transactions Using A Shared Coherency Manager" filed of even date herewith and assigned to the same assignee as the present application.

FIELD OF THE INVENTION

The present invention relates generally to data processing systems, and more particularly to testing the functionality of data processing snooping circuitry.

BACKGROUND OF THE INVENTION

An IEEE standard known as IEEE ISTO5001, or the Nexus debug standard, is an established real-time debug standard that supports real-time debug message generation. Debugging is a commonly used term that generally refers to testing of software or electronic circuitry to identify defects or "bugs" for the purpose of identification and reduction of the errors. The Nexus debug standard specifies a mechanism for identifying to an external trace reconstruction tool a predetermined operating condition within the system. Debugging processes are also used in the development of code for a data processing system.

Some data processing systems use multiple processors with closely coupled cache memories. A cache memory stores a subset of duplicative information that is stored in the system memory. Using a cache in the system may reduce the number of occurrences that a processor must communicate with the system memory via a system interconnect. However, the presence of various caches (or other memory devices) in a system can readily permit a data operand which has the same identifier or address to be present at various locations in the system. When the data operand is modified in one part of the system, an opportunity exists that an old version of the data operand will be stored or used. Memory coherency refers to the need of each processor in a multiple master data processing system to have access to the most recently modified data corresponding to a particular address in the memory system. The presence of differing data values for a same address value in a data processing system may lead to system errors.

To maintain memory coherency, reads and writes of information to the system memory are monitored or "snooped". When either a memory read or a memory write of data at an address is detected, this address of the transaction is used as a snoop address. A snoop request is initiated and directed to all caches in the system such that snoop lookups can be performed to search for any address in the caches that match the snoop address. A snoop hit occurs for every match, and any needed corrective action is taken to maintain coherency of the data at the address in the cache where the snoop hit occurs.

For a processor cache with a single set of tags, arbitration is needed between processor requests to search for addresses in its own cache (such as for performing a load or store instruction whose corresponding access address may be contained in the cache) and snoop requests to perform snoop lookups in the cache. In one arbitration solution used today, any pending snoop request blocks the processor from accessing its cache for one or more cycles. If snoop lookups occur frequently, then processor performance may be negatively impacted.

The debugging of a multiple core data processing system is a difficult and time consuming operation. Numerous aspects of the internal operation remain hidden from the debugger. The amount of parallel processing in such systems, along with the relatively non-predictable behavior of multi-core systems make debugging difficult, particularly with respect to shared memory and other shared resources. Arbitration, collisions for shared resources, cache conflicts and coherency transactions cause system behavior to appear non-deterministic to a user. Therefore assistance in debugging system scenarios that involve cache coherency operations is needed.

BRIEF DESCRIPTION OF THE DRAWINGS

The present invention is illustrated by way of example and not limitation in the accompanying figures, in which like references indicate similar elements, and in which:

FIG. 5 illustrates in diagrammatic form an example of one of the cache debug control registers of FIG. 4 in accordance with an embodiment of the present invention; and FIG. 6 illustrates in diagrammatic form an example of one of the watchpoint number specifier registers of FIG. 4 in accordance with another embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Figure 1:
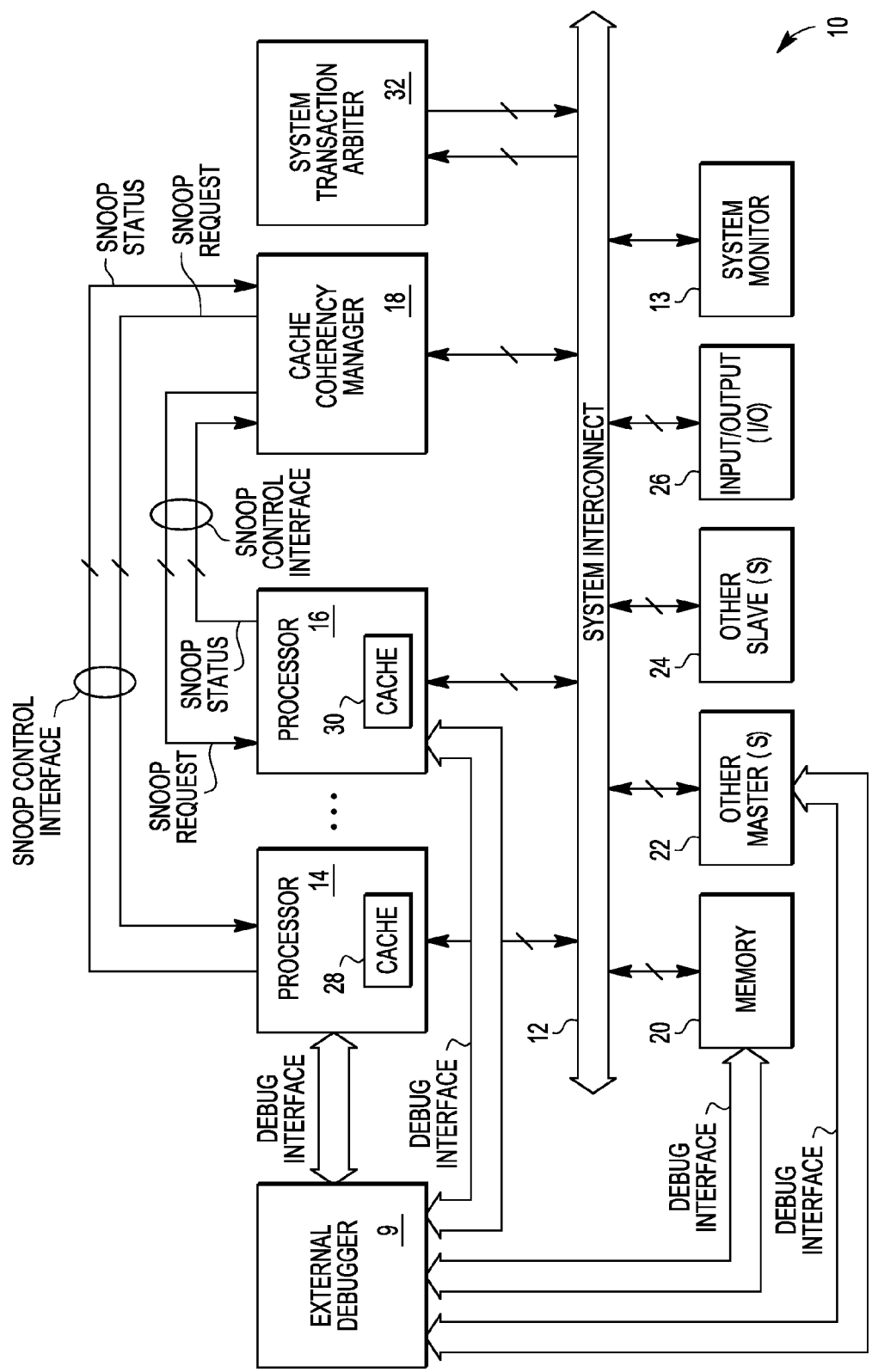
FIG. 1 illustrates a block diagram of a data processing system in accordance with a particular embodiment of the present invention.

FIG. 1 illustrates, in block diagram form, a data processing system 10 with debug control for data processing snoop injection into a processor snoop queue according to one embodiment of the present invention. Data processing system 10 has the capability of an external debugger, which is user programmable and implements programmed operations designed to observe and analyze the system, which inserts memory operations directly into a snoop queue of a processor without requiring a global transaction on the system bus or interconnect. Additionally, the processor does not have to be placed into a special mode of operation to permit the external debugger to directly insert cache command operations into a snoop queue of a processor. Data processing system 10 of FIG. 1 is a multiprocessor system and includes a processor 14, processor 16, cache coherency manager 18, system transaction arbiter 32, system memory 20, other master devices 22, other slave(s) 24, input/output (I/O) devices 26, and a system monitor 13. An external debugger 9 interfaces with each of processor 14, processor 16, system memory 20 and the other master devices 22 via respective debug interfaces. The external debugger 9 is typically implemented as circuitry that is off-chip or external to a semiconductor die. However, in some embodiments, a portion of all of the external debugger 9 may be implemented on-chip or on the same semiconductor die. The external debugger 9 is coupled to test or debug terminals of the processor 14, the processor 16, system memory 20 and the other master devices 22 via the respective debug interfaces.

The devices shown in FIG. 1 are communicatively coupled to a system interconnect 12 but may be coupled by other types of system interconnects in other embodiments. For example, the devices shown may be communicatively coupled by a system interconnect that includes a cross bar switch or other type of switch, or a system interconnect that includes multiple busses and/or switches. In one embodiment, a system interconnect may include multiple signal lines for address, data, and control information. In yet another form the system interconnect may be an optical interconnect or a wireless interconnect.

System transaction arbiter 32 arbitrates among various masters of system 10 for transactions on a system interconnect 12. I/O device(s) 26 may be any number of I/O devices such as keyboard controllers and communications ports. Other slave(s) 24 may include memory devices such as a system cache (e.g. L2 cache). Both other slave(s) 24 and I/O device(s) 26 may be accessible by transactions on system interconnect 12 that are generated by the master devices of the system (e.g. processor 14, processor 16, or other master(s) 22). In one embodiment, other master(s) 22 includes other types of processors (e.g. a digital signal processor) or a direct memory access (DMA) device which can generate transactions on system interconnect 12. In one embodiment, each master device of the other master devices 22 may also include a cache (not shown).

System 10 includes a cache coherency manager 18 that snoops system interconnect 12 for transactions and initiates snoop requests for various caches of system 10 (e.g. cache 28, cache 30) to determine whether the caches include the data operand (e.g. access address) of the transaction in order to maintain cache coherency. In one embodiment, if a cache contains a copy of the data operand, then that cache will invalidate the corresponding cache entry in response to the snoop request. In alternate embodiments, the cache containing a copy of the data operand may supply the most recent version of the data to the cache coherency manager 18 or to other caches or memory in data processing system 10 in order to maintain coherency. Any of a variety of coherency protocols may be used in various embodiments.

One example of a transaction is a write transaction by processor 16 to system memory 20 for writing data to a location in system memory 20. In response to the transaction, cache coherency manager 18 would generate a snoop request to the other caches (e.g. cache 28) to search for data of the same memory address. If a cache has an entry corresponding to the same memory address, then in one embodiment the cache would invalidate that data since an updated version is being provided to system memory 20 on system interconnect 12.

In the embodiment shown, system 10 includes a snoop control interface between the cache coherency manager 18 and each of the processors 14 and 16 for exchanging information regarding snooping operations. In the embodiment shown, the snoop control interface includes snoop request lines and snoop status. Alternate embodiments may include more or different lines within the snoop control interface.

These lines will be discussed below. In the embodiment shown, cache coherency manager 18 only includes snoop control interfaces with processors 14 and 16. However, in other embodiments, cache coherency manager 18 may include a snoop control interface with other devices having a cache (e.g. other master(s) 22, other slave(s) 24, and other caches). In alternative embodiments, processors 14 and 16 may include additional caches.

In the illustrated embodiment, system 10 also includes a system monitor 13. System monitor 13 may be, for example, a performance monitor or a global throughput monitor. Any known performance monitor or global throughput monitor may be used, where information from system monitor 13 can be used, for example, by one or more masters on the bus to alter one or more parameters. Additional details of system monitor 13 will be discussed below.

System 10 also includes the external debugger 9 which is a debugger that is preferably external to one or more integrated circuits containing a portion of the illustrated data processing system 10. The external debugger 9 interfaces with processor 14, processor 16, system memory 20 and the other master(s) 22 via respective debug interfaces. External debugger 9 has the ability to insert coherency operations directly into a snoop queue of any of processor 14, processor 16 and/or the other master(s) 22 without requiring a transaction on the system interconnect 12. The external debugger 9 operates without placing any of the processor 14, processor 16 or other master(s) 22 in a special operating mode and thus functions real-time. Specifically, external debugger 9 is able to directly insert a cache command operation into a snoop queue of any of processor 14, processor 16, and the other master(s) 22.

In other embodiments, other types of data systems may include different configurations and/or have additional circuitry. Also, other embodiments may not have all of the circuitry shown in FIG. 1. In one embodiment, some or all of the circuitry shown in FIG. 1 may be implemented on one integrated circuit. However, in other embodiments, system 10 may be implemented with multiple integrated circuits.

In one embodiment, system 10 may be implemented as part of an information system such as e.g. a computer, cell phone, PDA, electronic control circuitry of an automobile, or other type of system implementing a data processing system.

Figure 2:
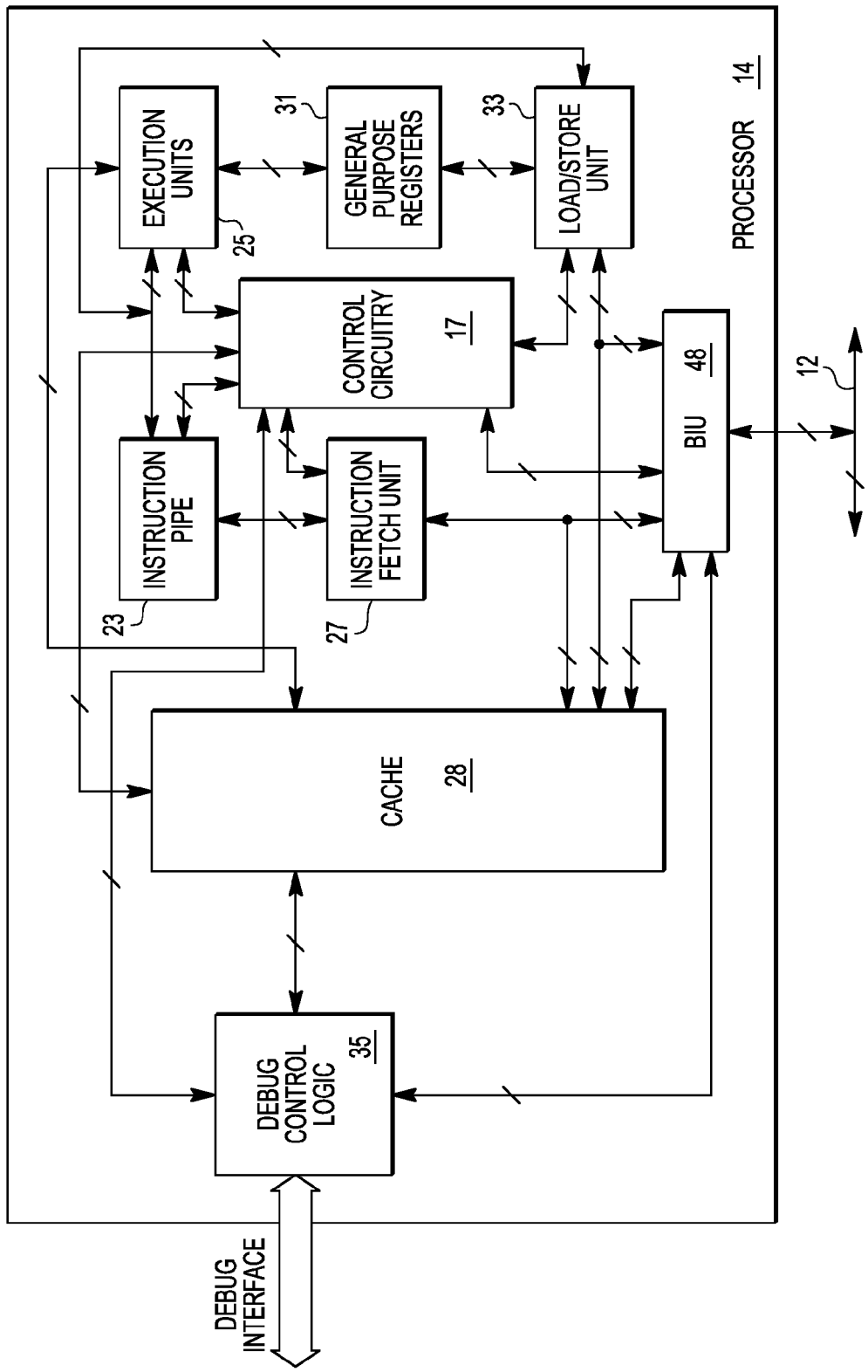
FIG. 2 illustrates a block diagram of a processor implemented in the system of FIG. 1 in accordance of a particular embodiment of the present invention.

Illustrated in FIG. 2 is a portion of processor 14 which further details the control circuitry within processor 14 between cache 28, a bus interface unit (BIU) 48 and the debug interface illustrated in FIG. 1. Elements which are common with those of FIG. 1 are numbered the same as in FIG. 2. BIU 48 has a first input/output terminal that is connected to system interconnect 12 as previously described. A second input/output terminal of BIU 48 is connected to a fifth input/output terminal of cache 28 and to a first input/output terminal of instruction fetch unit 27. A third input/output terminal of BIU 48 is connected to a first input/output terminal of control circuitry 17. A fourth input/output terminal of BIU 48 is connected to a sixth input/output terminal of cache 28 and to a first input/output terminal of a load/store unit 33. A second input/output terminal of the instruction fetch unit 27 is connected to a first input/output terminal of an instruction pipe or instruction pipeline 23. A second input/output terminal of instruction pipeline 23 is connected to a first input/output terminal of execution units 25. Execution units 25 generally include units such as a floating point unit, an integer unit and other processing units. A third input/output terminal of instruction pipeline 23 is connected to a second input/output terminal of control circuitry 17. A third input/output terminal of instruction fetch unit 27 is connected to a third input/output terminal of control circuitry 17. A fourth input/output terminal of cache 28 is connected to a fourth input/output terminal of control circuitry 17. A fifth input/output terminal of control circuitry 17 is connected to a second input/output terminal of execution units 25. A third input/output terminal of execution units 25 is connected to the second input/output terminal of cache 28. A fourth input/output terminal of execution units 25 is connected to a first input/output terminal of general purpose registers (GPRs) 31. A second input/output terminal of general purpose registers 31 is connected to a second input/output terminal of load/store unit 33. A third input/output terminal of load/store unit 33 is connected to the second input/output terminal of instruction pipeline 23 and to the first input/output terminal of execution units 25. A fourth input/output terminal of load/store unit 33 is connected to a sixth input/output terminal of control circuitry 17. Debug control logic 35 has a first input/output terminal connected to the debug interface. A second input/output terminal of debug control logic 35 is connected to a sixth input/output terminal of control circuitry 17. A third input/output terminal of debug control logic 35 is connected to a sixth input/output terminal of cache 28. A fourth input/output terminal of debug control logic 35 is connected to a sixth input/output terminal of the BIU 48.

In operation, control circuitry 17 of processor 14 functions to control and coordinate BIU 48 and cache 28 operations as well as the instruction fetch, decode and various execution units of processor 14. Under control of control circuitry 17, instructions are coupled via BIU 48 or cache 28 into the instruction fetch unit 27 and placed in the instruction pipeline 23. The instructions are executed by execution units 25 and results are stored off in GPRs 31. Load/store unit 33 operates under control of control circuitry 17 to load or store information needed for processing by execution units 25 from GPRs 31, cache 28 and/or system interconnect 12. Therefore, the portion of processor 14 detailed in FIG. 2 illustrates the instruction execution operation of processor 14 separate from the cache coherency management function. Various alternate embodiments of processor 14 may be implemented as well. The debug control logic 35 provides various debug functions within processor 14 and also provides the capability for the external debugger 9 to insert coherency operations directly into snoop circuitry detailed below of processor 14 without requiring a system transaction on the system interconnect 12. The avoidance of requiring system transactions on the system interconnect 12 provides for increased system bandwidth as non-debug operations may be implemented on the system interconnect 12 rather than operations associated with debug. In addition, debug operations involving cache coherency operations may be limited or targeted to a single processor or other bus master, rather than involving the operation of cache coherency manager 18, as would be the case if the coherency transactions were provided on system interconnect 12 and affect multiple units within the data processing system 10. Additionally, the cache debug command operations may be performed without placing the processor in a special mode, such as a debug halted mode or a test mode, in which the normal instruction processing of the processor is suspended, and without causing the normal instruction processing stream of the processor to be altered such as by causing a processor interrupt to occur for causing interrupt processing to be initiated for the debug command processing. Such operations interfere dramatically with the normal execution path of the processor, and may cause the specific condition being debugged to become masked, as well as causing an intrusive action which may prevent the processor from meeting real time deadlines, performance requirements, or other detrimental side-effects.

Figure 3:
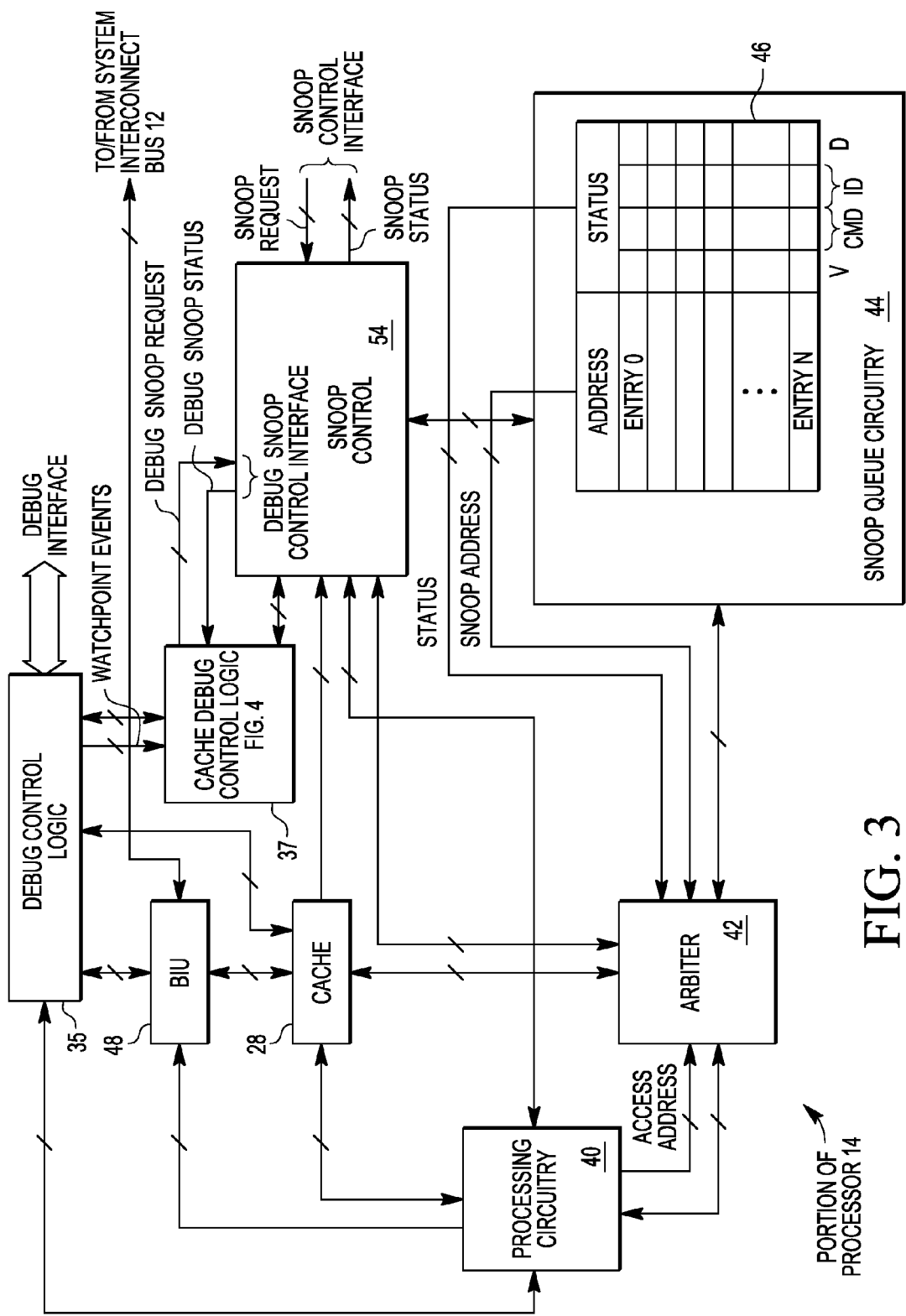
FIG. 3 illustrates a block diagram of a portion of a cache in accordance with a particular embodiment of the present invention.

Illustrated in FIG. 3 is further detail of a portion of processor 14 which further details cache 28 and associated cache snooping circuitry, in accordance with one embodiment of the present invention. Reference elements illustrated in FIG. 3 that are common with reference elements of FIGS. 1 and 2 are numbered the same. BIU 48 has a first input/output terminal connected via a bidirectional multiple-bit conductor to system interconnect 12. Processing circuitry 40 of processor 14 has a first output that is connected to an input of BIU 48. A second input/output terminal of BIU 48 is connected to a first input/output terminal of cache 28. A second input/output terminal of cache 28 is connected via a bidirectional multiple-bit conductor to a first input/output terminal of processing circuitry 40. A third input/output terminal of cache 28 is connected via a bidirectional multiple-bit conductor to a first input/output terminal of an arbiter 42. An output terminal of cache 28 is connected to a first input terminal of snoop control 54. A second output of processing circuitry 40 is connected to a first input of arbiter 42 for providing an access address. A second input/output terminal of processing circuitry 40 is connected to a second input/output terminal of arbiter 42. Snoop control 54 has a second input/output terminal connected to a third input/output terminal of the arbiter 42. A third input/output terminal of snoop control 54 is connected to a third input/output terminal of processing circuitry 40. A first output of snoop control 54 provides a snoop status signal, and a second input of snoop control 54 receives a snoop request signal, both of which may be considered part of the snoop control interface. Snoop queue circuitry 44 has a first output connected to a second input of arbiter 42 for providing a snoop address from the stored (N+1) entries. A second output of snoop queue circuitry 44 is connected to a third input of the arbiter 42 for providing status information associated with each snoop address. This status information may be provided to indicate that the current snoop address is valid and that a request for snoop lookup to arbiter 42 is valid. A fourth input/output terminal of the arbiter 42 is connected to a first input/output terminal of snoop queue circuitry 44 for providing access control. This access control is used to handshake snoop requests and snoop grants and coordinates the operation of the snoop queue circuitry 44. A fourth input/output terminal of snoop control 54 is connected to a second input/output terminal of snoop queue circuitry 44 for providing snoop addresses and other snoop request information from the system interconnect 12 to the snoop queue circuitry 44. Snoop queue circuitry 44 includes a snoop request queue 46 having (N+1) entries, where N is an integer. Each entry in the snoop queue circuitry 44 has an address portion and a status portion that has several fields such as a valid (V) field, a command (CMD) field, an identification (ID) field and a debug (D) field. Debug control logic 35 has a first input/output terminal connected to the debug interface and a second input/output terminal connected to a first input/output terminal of cache debug control logic 37. A second input/output terminal of cache debug control logic 37 is connected to a fifth input/output terminal of snoop control 54. An output of debug control logic 35 is connected to a first input of the cache debug control logic 37 for providing watchpoint event information. A second output of the snoop control 54 is connected to a second input of the cache debug control logic 37 for providing Debug Snoop Status information. A third input of the snoop control 54 is connected to an output of the cache debug control logic 37 for providing a Debug Snoop Request. The Debug Snoop Request and the Debug Snoop Status information form a debug snoop control interface as indicated in FIG. 3. A third input/output of the debug control logic 35 is connected to a fourth input/output terminal of the cache 28. A fourth input/output terminal of the debug control logic 35 is connected to a third input/output terminal of the processing circuitry 40.

Processing circuitry 40 may include circuitry typically found in a processor such as e.g. an instruction pipe unit, execution units, an instruction fetch unit, control circuitry, general purpose registers, a load store unit, and a prefetch unit. For example, in one embodiment, processing circuitry 40 may include instruction pipe 23, instruction fetch unit 27, control circuitry 17, execution units 25, GPRs 31, and load/store unit 33, of FIG. 2. Processors of other embodiments may include other types of circuitry.

In one embodiment, during processor operations, processing circuitry 40 executes instructions that generate requests for data to be read from system memory 20 (or other slave or I/O devices) and for data to be written to system memory 20 (or other slave or I/O devices). In response to a request for data having a system memory address (e.g. generated by load/store unit 33 or instruction fetch unit 27) processing circuitry 40 will check cache 28 (via arbiter 42) to see if it has any data that corresponds to that system memory address. If not, load/store unit 33 of processing circuitry 40 may generate via BIU 48 a transaction on system interconnect 12 to request data from system memory 20 at that system address. In response to the read transaction, the system memory 20 will provide the requested data on system interconnect 12 to processor 14 where BIU 48 receives the data and provides the data to processing circuitry 40 and to cache 28 in some embodiments. After receiving the data by processor 14, the transaction is completed. Write transactions to the system memory 20 can be initiated by processor 14 where a write address and data are provided on system interconnect 12 to be written to the system memory 20 at the address, and may also be written to cache 28. Also, data may be written to or read from other slave(s) 24 and I/O device(s) 26 of data processing system 10 in other embodiments.

Cache 28 may be an instruction cache, a data cache, or a combination of the two. The use of the term "data" herein in regards to a transaction may refer to the information stored in either an instruction cache or a data cache.

Processor 14 also includes circuitry for snoop request management. The snoop request circuitry operates to keep the data in cache 28 coherent with other copies of the data stored in the system memory 20 and other caches of data processing system 10. Snoop control 54 receives snoop requests from cache coherency manager 18 via the snoop control interface. Processor 14 includes snoop queue circuitry 44 including snoop request queue 46 for storing snoop requests received from the snoop control interface. In one embodiment, snoop request queue 46 may be implemented as a first-in first-out buffer (FIFO). In one embodiment, the FIFO may be implemented as a circular buffer.

Within snoop request queue 46 is a plurality of (N+1) entries where N is an integer. Each entry in snoop request queue 46 has an address field and a status field that includes status information. The address field stores the address of the transaction for which a snoop request was generated. In the embodiment shown, a first status bit is a valid (V) bit which indicates whether the entry in snoop request queue 46 is valid. Other types of status bits may be included in other embodiments. Each entry also includes a snoop request ID field that stores a snoop request ID for the snoop request generated by the cache coherency manager 18 or the cache debug control logic 37, and a debug (D) field that indicates that the entry is a debug function and the source of the entry is from the external debugger 9 via the debug control logic 35 and cache debug control logic 37. Snoop requests may be either a debug snoop request or a non-debug snoop request.

In operation, snoop control 54 and snoop queue circuitry 44 operate to keep cache 28 coherent with other copies of the information in system 10. Snoop control 54 receives a snoop request from cache coherency manager 18 via the snoop control interface and provides the address of the snoop request, along with the request ID to be stored in snoop request queue 46. Because this snoop request is not from the external debugger 9, the debug field of the entry is not asserted. Therefore, in one embodiment, cache coherency manager 18 may be characterized as detecting possible incoherencies caused by at least one transaction between a processor and system memory 20 or within a processor and a cache. The snoop requests provided by cache coherency manager 18 to snoop control 54 may therefore arise from these possible incoherencies. In an alternate embodiment, the functionality of cache coherency manager 18 may be distributed within the different masters of system 10. For example, the functions may be performed within each of the processors 14-16.

Arbiter 42 arbitrates access to cache 28 between the processing circuitry 40 and snoop queue circuitry 44 in an efficient manner to minimize the time that processing circuitry 40 does not have access to cache 28. This minimization may be accomplished in one embodiment, by performing arbitration based on idle cycles of processing circuitry 40 or based on idle cycles.

When a snoop request is received by snoop control 54, snoop control 54 routes the snoop address to the snoop queue circuitry 44. Various embodiments of the function of snoop queue circuitry 44 may be implemented. In one embodiment, all received snoop addresses from snoop control 54 are stored in snoop request queue 46. When arbiter 42 provides snoop queue circuitry 44 with access to cache 28, access addresses from the processing circuitry 40 are not permitted to cache 28 via arbiter 42. In this mode of operation, arbiter 42 provides the snoop addresses from snoop request queue 46 to cache 28 for searching (i.e. for performing a snoop lookup operation). The snoop addresses are removed from the snoop request queue 46 on a first-in, first-out (FIFO) basis.

When a snoop address is present in snoop request queue 46, snoop queue circuitry 44 signals arbiter 42 to request arbiter 42 to arbitrate for access to cache 28. In one embodiment, cache 28 has a single set of address tags and therefore must be either be dedicated to the processor (i.e. processing circuitry 40) for addressing or to snoop queue circuitry 44 for addressing. When arbiter 42 prevents access by processing circuitry 40 to cache 28, snoop addresses from circuitry 44 are routed through arbiter 42 to cache 28. Circuitry within cache 28 performs a snoop look-up operation. The snoop-lookup operation includes comparing the snoop address with all the addresses presently stored in cache 28. In one embodiment, if a match occurs, the matching entry in cache 28 is marked as invalid since it is potentially different from the entry of the transaction on system interconnect 12. If no match occurs, no further action is taken within cache 28. The hit determination, and the invalidating of the matching entry if a hit does occur may also be referred to as part of the snoop look-up operation. In some embodiments, snoop control 54 may signal arbiter 42 to arbitrate for access to cache 28.

Therefore, arbiter 42 arbitrates access to cache 28 between access addresses from processing circuitry 40 and snoop addresses from snoop queue circuitry 44. In one embodiment, processing circuitry 40 may signal to arbiter 42 for the need to access cache 28 by simply providing an access address to arbiter 42, which operates as a processing circuitry request for access to cache 28. Alternatively, a separate processing circuitry request signal may be provided from processing circuitry 40 to arbiter 42 to request access to cache 28 for a current access address. Similarly, in one embodiment, snoop queue circuitry 44 may signal to arbiter 42 for the need to access cache 28 by simply providing a snoop address to arbiter 42. Alternatively, a separate snoop circuitry access request signal may be provided from snoop queue circuitry 44 to arbiter 42 to request access to cache 28 for a current snoop address corresponding to a next snoop request in snoop request queue 46.

In one embodiment, arbiter 42 selects priority between an access address and a snoop address for accessing cache 28 based on idle cycles of processing circuitry 40. In another embodiment, arbiter 42 may always wait for an idle access request cycle from processing circuitry 40 for allowing access of a snoop address to cache 28. Note that an idle access request cycle (or an idle cycle) may refer to any clock cycle in which processing circuitry 40 does not have a pending access address requiring access to cache 28. An active cycle may refer to any clock cycle in which processing circuitry 40 requires access to cache 28, or to any clock cycle which is not considered an idle cycle.

In the embodiment shown in FIG. 3, the snoop control interface includes a snoop request signal interface and a snoop status signal interface. Alternatively, other or different signals may be included, such as, for example, a snoop acknowledgement signal interface, a snoop error signal interface, etc.

In one embodiment, the snoop request signal interface includes a request signal line for indicating that a snoop request is being made, a snoop command line indicating the type of bus transaction that generated the snoop, a snoop address line which is the address of the transaction being snooped, and a snoop request ID line, which is a number generated by the cache coherency manager identifying the snoop request. These signal lines may be multi-bit (either in parallel or serial in some embodiments) or single bit in some embodiments.

The snoop status signal interface is used to indicate to the cache coherency manager 18 that a snoop request has been processed by the cache and the result of the cache snoop (e.g. whether an entry for the data address was found in the cache or not or whether an error (parity or other error type) was found with the data of the entry). In one embodiment, the snoop status interface includes a snoop response line and a snoop request ID line indicating the ID number of the snoop request. These lines may be multi-bit as well.

When the external debugger 9 provides a debug command associated with cache 28 via the debug interface, the debug control logic 35 decodes the debug command and signals the cache debug control logic 37. Various debug commands associated with a cache may be executed. For example, a synchronization (Synch) command when inserted into the snoop queue circuitry functions to empty the snoop queue of all cache snoop commands received up until that point in time. An Invalidate command when inserted into the snoop queue circuitry functions to invalidate the cache information associated with the address of the snoop queue entry. A Flush command when inserted into the snoop queue circuitry functions to push out or read the cache line of information associated with the address of the snoop queue entry. A Flush with Invalidate command when inserted into the snoop queue circuitry functions to push out or read the line of information associated with the address of the snoop queue entry and invalidate the line of the information in the cache. Any of these or other cache coherency operations may be implemented by the external debugger 9 to debug control logic 35 which passes the relevant control and receives the relevant status to/from the cache debug control logic 37. In processing a debug snoop request command issued by the external debugger 9, the cache debug control logic 37 provides a debug snoop request signal to the snoop control 54 via the debug snoop control interface which contains address information associated with the desired address to be snooped, along with control information indicating the type of snoop request operation to be performed. In response the snoop control 54 generates a snoop entry in the snoop queue circuitry 44 in which the debug field is asserted to indicate that the snoop entry is associated with a debug operation. The snoop entry contains the requested cache line address and status information that indicates that the snoop queue entry is valid and the type of command to be performed. The status information also contains an ID field which indicates the ID of the snoop cache coherency operation requested. The debug status field D, or debug indicator, corresponding to each snoop request indicates that the snoop queue entry is a debug entry and that the cache 28 should provide the information associated with the entry's address to the debug control logic 35, rather than to the cache coherency manager 18. The processing circuitry 40 interacts with the debug control logic 35 to implement any debug functionality that is not performed by the debug control logic 35, the cache debug control logic 37 and the debug functionality implemented in the snoop control 54. The snoop control 54 functions in combination with the arbiter 42 to determine when the debug snoop queue entry is processed. The debug field identifier is used in the routing of the snoop command execution results of the snoop queue entry back to the cache debug control logic 37 for eventual presentation back to the external debugger 9 to indicate which snoop command the response is associated with. The snoop control 54 provides the debug snoop status signal to the cache debug control logic 37 when the entry is executed. The response to executing the snoop command in the snoop request queue 46 is received by the external debugger 9 via one or more status registers within the cache debug control logic 37 that is described below in connection with FIG. 4. The one or more status registers are mapped into the control register space of the debug control logic 35 for access by the external debugger 9. The stored debug flag D in each entry of the snoop request queue 46 allows the snoop control circuitry 54 to properly route the results of a processed snoop command to the original requestor of the command. Snoop commands requested by the external debugger 9 via the cache debug control logic 37 will have the D status flag set in the related snoop queue entry, while snoop commands requested by the cache coherency manager 18 via the snoop control interface will be stored in the snoop request queue 46 with the D flag cleared. As each snoop request at the head of the snoop request queue 46 is processed under control of the arbiter 42, the flag is examined to determine the proper recipient of the results of the snoop operation. In this manner, debug snoop commands may be performed transparently to the operation of the cache coherency manager 18 and transparently to other caches in the data processing system 10. Additionally, in one embodiment, the cache debug control logic 37 has the ability to synchronize or time the insertion of debug snoop commands into the snoop request queue 46 by the snoop control 54 based upon a set of one or more trigger conditions such as watchpoints, for example.

Figure 4:
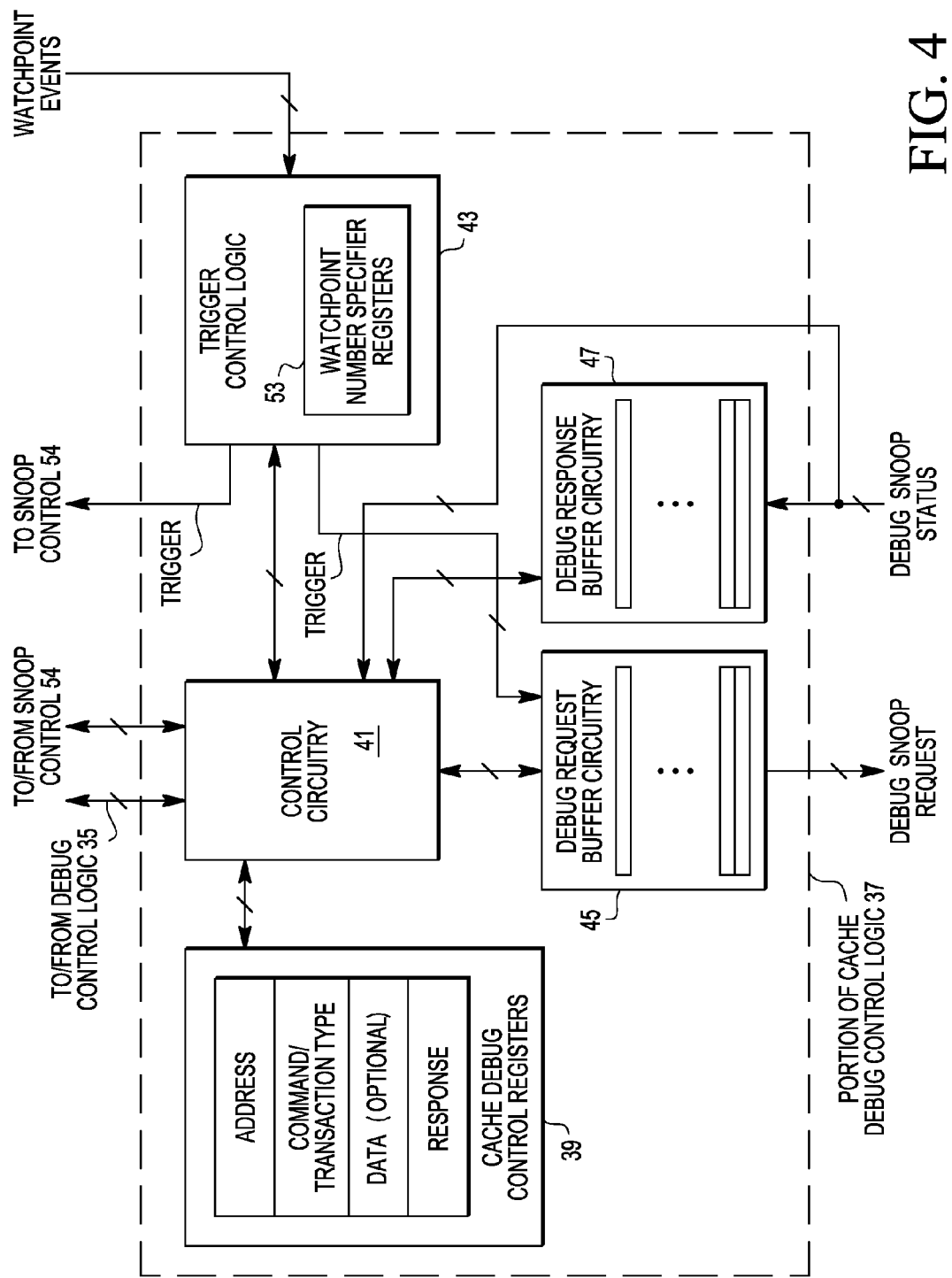
FIG. 4 illustrates a block diagram of a portion of cache debug control logic in accordance with a particular embodiment of the present invention.

Illustrated in FIG. 4 is a portion of the cache debug control logic 37 that further illustrates the functionality of the debug control of the snoop request queue 46. Control circuitry 41 interfaces directly with both the debug control logic 35 and the snoop control 54. The control circuitry 41 has a first input/output terminal connected to the second input/output terminal of the debug control logic 35 described above. A second input/output terminal of control circuitry 41 is connected to/from the snoop control 54. A third input/output terminal of control circuitry 41 is connected to an input/output terminal of cache debug control registers 39. The cache debug control registers 39 are a plurality of storage devices such as registers that hold address information, a command or transaction type, data (optional) and a response. This information is held for each debug snoop command. The control circuitry 41 has a fourth input/output terminal that is connected to an input/output terminal of debug request buffer circuitry 45. The debug request buffer circuitry 45 has a plurality of storage registers for holding debug snoop requests. An output of the debug request buffer circuitry 45 is a debug snoop request signal. A fifth input/output terminal of the control circuitry 41 is connected to an input/output terminal of debug response buffer circuitry 47. The debug response buffer circuitry 47 has a plurality of storage registers for holding debug snoop status information associated with each processed debug snoop request. An input of the debug response buffer circuitry 47 is a debug snoop status signal which provides status information associated with each processed debug snoop request, as routed back by snoop control 54 in response to the processed snoop command having the D flag set in snoop request queue 46. The debug snoop status signal is also connected to an input of the control circuitry 41. A sixth input/output terminal of the control circuitry 41 is connected to an input/output terminal of trigger control logic 43. The trigger control logic 43 includes one or more watchpoint number specifier registers 53. The trigger control logic 43 has a first output connected to an input of the debug request buffer circuitry 45 for providing a trigger signal. A second output of the trigger control logic 43 also provides the trigger signal to the snoop control 54. An input terminal of the trigger control logic 43 receives watchpoint events from the debug control logic 35.

In operation, the debug control logic 35 interprets debug commands from the external debugger 9 and reads and writes the cache debug control registers 39 subject to the type of operation provided by the external debugger 9. The external debugger 9 provides to the debug control logic 35 commands to initiate the debug snoop requests by providing a snoop address, a snoop command/transaction type, and a snoop ID value for processing. The debug control logic 35 provides this information to the cache debug control logic 37 by writing the respective cache debug control register 39. The stored information is used to create a debug snoop request which is placed in debug request buffer circuitry 45 by control circuitry 41. Processing of stored commands in the debug request buffer circuitry 45 to generate debug snoop requests to the snoop control 54 via the debug snoop control interface is subject to selective delay by generation of a trigger signal by the trigger control logic 43 in one embodiment. When a command from the external debugger 9 indicates a snoop operation request, debug control logic 35 causes the cache debug control registers 39 to be updated with the relevant information needed for processing the snoop operation. The address and command and transaction type information of the cache debug control registers 39 is coupled via the control circuitry 41 into the debug request buffer circuitry 45 for subsequent provision to the snoop control 54 via the debug snoop control interface debug snoop request signals. When debug snoop requests that are stored in the snoop request queue 46 have been processed by the snoop control 54 and arbiter 42, the resulting debug snoop status signals are received and stored in the debug response buffer circuitry 47. The debug response buffer circuitry 47 enables the external debugger 9 to be decoupled from the internal snoop lookup operations by buffering snoop responses for subsequent retrieval by the external debugger 9 via the cache debug control registers 39. External debugger 9 typically operates at a much slower rate than the internal circuitry of any of processor 14 through processor 16. Thus a buffering mechanism is typically used to ensure that all responses are made available to the external debugger 9. The debug snoop status signals stored in the debug response buffer circuitry 47 as debug snoop operations are acknowledged by the snoop control 54 to the cache debug control logic 37. The debug response buffer circuitry 47 queues responses as they are received, and the entry at the head of the debug response buffer circuitry 47 is coupled for storage in the data and response fields of the cache debug control registers 39 for subsequent retrieval by the external debugger 9 via commands provided to the debug control logic 35 which are processed by the cache debug control 37. As the external debugger 9 retrieves information on a processed debug snoop command by reading the Response register of the cache debug control registers 39, the next valid entry from the head of the debug response buffer queue is placed into the response register in a FIFO manner. The response in the form of a debug snoop status indicates that the debug command requested by the external debugger 9 was performed. The status information contains an ID field corresponding to the original ID of the debug snoop command as well as information in a valid field (V) concerning the validity of the debug snoop command and information in a command field (CMD) concerning the result of the command, such as success/fail, hit/miss, etc. Routing of a response from a processed snoop command from the snoop queue circuitry 44 is supported by the use of the debug flag (D) or debug field in the status field of each entry of the snoop queue circuitry 44. The debug flag indicates whether the external debugger 9 initiated the command or whether the command in the snoop request queue 46 was received from the snoop control interface to the cache coherency manager 18. Debugger-initiated snoop operations do not broadcast back to the data processing system 10 and thus are minimally intrusive into the data processing system 10. In some embodiments, it may be desirable to control the point in time that a snoop request from the external debugger 9 is presented to the snoop control 54 for processing. That is, it may be useful to preload one or more debug snoop requests from the external debugger 9 into the debug request buffer circuitry 45 and have a system or processor event control the actual generation of a debug snoop request from the cache debug control logic 37 to snoop control 54, particularly since the external debugger 9 and the debug interface from external debugger 9 to debug control logic 35 may be operating significantly slower than the remainder of data processing system 10, in many cases thousand to tens of thousands of times slower. The trigger control logic 43 generates a trigger signal that functions to synchronize initiation of either entering a debug command into the snoop request queue 46 from debug request buffer circuitry 45, and/or may also provide the function of forcing a debug command from the head of the snoop request queue 46 based on one or more processor events such as a watchpoint event that is monitored in the data processing system 10. Specifically, the trigger control logic 43 may be configured to wait for a specific trigger event to generate a trigger signal that causes one or more transactions stored in debug request buffer circuitry 45 associated with a previously received debug command from the external debugger 9 to be loaded into the snoop request queue 46. In this implementation the trigger signal is generated and provided to the debug request buffer circuitry 45 for causing one or more stored entries in debug request buffer circuitry 45 to be sent to the snoop control 54 via the debug snoop control interface for processing. Alternately, the trigger control logic 43 may be configured to wait for a specific trigger event to be detected and then to cause an already buffered debug snoop request at the head of snoop request queue 46 to be processed in response to generation of the trigger signal. This allows for further control over the synchronization of a debug snoop request to processor 14 activity in order to control the boundary at which the snoop request is processed, allowing a real-time request to be simulated by the external debugger 9. In this alternate implementation a trigger signal is generated by the trigger control logic 43 and provided to the snoop control 54 which in response provides the debug snoop request at the head of the snoop request queue 46 to arbiter 42 for processing. In some embodiments, a snoop request at the head of snoop request queue 46 may not be automatically sent to the arbiter 42 if the snoop request queue 46 contains only a limited number of valid entries, and may instead give the processor a higher priority for accesses to cache 28. This alternate implementation allows for the snoop control 54 to cause the request at the head of the snoop request queue 46 to be requested to arbiter 42 regardless of the fullness of snoop request queue 46 if the D bit of the head queue entry is set, indicating the request is a debug snoop request. The trigger control logic 43 may range in complexity from an address and associated command or specifier comparison which is indicated by assertion of one or more watchpoint event signals provided from debug control logic 35 in response to the occurrence of a predetermined watchpoint condition to a sequence driven state machine that uses debug resources such as watchpoints in more complex ways. The registers of the cache debug control registers 39 are JTAG (Joint Test Action Group)—addressable registers and are used to implement cache debug snoop operations using JTAG commands from the external debugger 9. The response register of the cache debug control registers 39 provides the output of the snoop lookups back to the external debugger 9 as the snoops are processed and the responses are retrieved by the external debugger 9 from the debug response buffer circuitry 47 via the response register.

An example of a format of the command and transaction type field of the cache debug control registers 39 is illustrated in FIG. 5. It should be understood that in other embodiments additional fields may be implemented and that the physical ordering of the fields is a matter of choice. A first field is a "Wait for Trigger" field and enables one aspect of the trigger control logic 43 functionality. In one form this field is a single bit wherein when the Wait for Trigger bit is a zero there is no waiting for a trigger event and when the Wait for Trigger bit is a one, the control circuitry 41 waits for a trigger event before issuing a debug snoop request with this bit set from the debug request buffer circuitry 45 to snoop control 54. A second field is a Buffer field which also may be implemented as a single bit. When the buffer field is a zero value the control circuitry 41 will not wait for a trigger event and will not wait for the "Go" command to be described herein. When the buffer field is written to a one value for a debug snoop command provided by the external debugger 9, the control circuitry 41 will wait for a trigger event or for the "Go" command before allowing the entry in the buffer to cause a debug snoop request to snoop control 54 via the debug snoop interface. In this embodiment, multiple entries may be buffered in debug request buffer circuitry 45 and held awaiting a Go value of 1 or a trigger event before being provided to snoop control 54 for entry into the snoop request queue 46. A third field in the command register is a Go field which also may be implemented as a single bit. When the Go field is written to a zero value, the control circuitry 41 will not allow buffered entries in the debug request buffer circuitry 45 to start requesting the snoop control 54 to enter the entries into the snoop request queue 46. When the Go field is written to a one value, the control circuitry 41 will allow buffered entries in the debug request buffer circuitry 45 to start requesting the snoop control 54 to enter the entries into the snoop request queue 46. A fourth field is the snoop command field which contains the specific function of the debug snoop command. As explained above the debug snoop command may implement various functions, such as an invalidate function, a synchronize function or a flush function, for example. A fifth field is the snoop identifier (ID) which is one of the status fields within the snoop request queue 46 as described above, and is provided back to the debug response buffer circuitry 47 following processing of each debug snoop request to be stored with the response information for retrieval by external debugger 9. In an alternate embodiment, the debug request buffer circuitry 45 may contain threshold logic to determine how many entries have been buffered internally prior to being sent to the snoop control 54, the buffering occurring as each command is received with the buffer bit written to a "1". After a predetermined number of entries have been buffered and a queue fullness threshold value reached, the buffered entries may be triggered to begin processing. The predetermined threshold value, number, or level, may be a user programmable value provided via a register (not shown) within the cache debug control registers 39, or may be a hardwired value, or a dynamic value determined by other logic within the data processing system 10.

Illustrated in FIG. 6 is an example of one of various implementations of the watchpoint number specifier registers within the trigger control logic 43. The illustrated example represents control for either type of trigger function described above. In the illustrated form the watchpoint number specifier registers has eight fields wherein each field is correlated to a predetermined one of the watchpoints that may be used to condition a debug command trigger action on. Various watchpoints may be used and this programmable register provides a user of data processing system 10 flexibility in programming what trigger events are used to diagnose the performance of the data processing system 10.

It should be understood that in other embodiments, data processing system 10 may include processors of other configurations that perform transactions and snoop operations in a different manner. For example, a processor may have other circuitry not shown in FIG. 3 or may not include all of the circuitry shown in FIG. 3. Also, a processor may include other circuitry for handling snoop requests in another manner as well, rather than by invalidation of matching cache entries. Additionally, in other embodiments the specific configuration of illustrated processors of data processing system 10 may perform transaction and snoop operations in a different manner than described herein.

By now it should be apparent that there has been provided a multiple core data processing system that can interact with an external debugger to insert coherency operations directly into a snoop queue of a processor without requiring a global transaction on the system interconnect. The external debugger can insert cache command operations into the snoop queue of a processor to permit the external debugger to semi-transparently reconfigure the contents of calibration data structures, such as debug request buffer circuitry 45, while performing a calibration operation without placing the associated processor in a special operating mode. The external debugger 9 may update data in one or more pages of memory while the data processing system 10 is running and then cause the cache of a processor to be flushed of entries associated with the modified information. Minimal intrusion into the operation of the data processing system 10 is required thereby permitting a debug operation to be self-contained within a processing subsystem of a multiple core system. The operation of the external debugger 9 avoids affecting global operation of the remainder of the data processing system 10. A flag in a status field of the snoop request queue 46 indicates an external debugger-requested command. The command is used to direct a response back to the external debugger instead of directing the response into the system which would further interrupt system operation. After completion of the debugger-initiated snoop transaction, a status response is provided to the external debugger 9. Prior to loading a debug snoop command into a snoop queue, a trigger mechanism controls the ability to perform the loading based on predetermined trigger events, such as watchpoint events.

Because the apparatus implementing the present invention is, for the most part, composed of electronic components and circuits known to those skilled in the art, circuit details are not explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, the memory may be located on a same integrated circuit as the processors or on a separate integrated circuit or located within another peripheral or slave discretely separate from other elements of system 10. Peripherals and I/O circuitry may also be located on separate integrated circuits or devices. Also system 10 may be embodied in a hardware description language of any appropriate type.

In one form there is herein provided a data processing system having a cache and snoop circuitry having a snoop request queue which stores non-debug snoop requests and debug snoop requests, wherein the snoop circuitry receives the non-debug snoop requests in response to transactions snooped from a system interconnect and receives the debug snoop requests in response to debug snoop commands from a debugger, and wherein the snoop circuitry provides the non-debug snoop requests and the debug snoop requests from the snoop request queue to the cache. Debug control circuitry provides the debug snoop requests in response to the debug snoop commands to the snoop circuitry for storage into the snoop request queue. In another form the debug snoop requests are provided to the snoop request queue in response to the debug snoop commands without use of the system interconnect. In yet another form the debug snoop requests are provided to the snoop request queue in response to the debug snoop commands without placing the data processing system in a halted mode. In another form the snoop request queue includes a plurality of entries, each entry for storing a request. Each request can either be a non-debug snoop request or a debug snoop request, and the snoop circuitry includes a debug indicator corresponding to each request in the snoop request queue which indicates whether the request is a non-debug snoop request or a debug snoop request. In another form the snoop circuitry, in response to a processed request formed by the cache processing a request from the snoop request queue, uses the debug indicator corresponding to the processed request to route a snoop response corresponding to the processed request to either the debug control circuitry or the system interconnect. In another form the snoop circuitry, in response to the cache processing a debug snoop request from the snoop request queue, provides a corresponding debug snoop response to the debug control circuitry and, in response to the cache processing a non-debug snoop request from the snoop request queue, provides a corresponding non-debug snoop response to the system interconnect. In yet another form there is provided trigger control logic which provides a first trigger signal to indicate when a debug snoop request is to be provided from the debug control circuitry for storage into the snoop request queue. In one form the trigger control logic provides a second trigger signal to indicate when a debug snoop request at a head of the snoop request queue is to be provided to the cache for processing. In yet another form the trigger control logic provides the first trigger signal in response to occurrence of a specified debug event.

In another form there is provided a method for use in a data processing system. A debug snoop request is received in response to a debug snoop command from a debugger. The debug snoop request is stored into a first entry of a snoop request queue and setting a first debug indicator corresponding to the first entry to a first value. A non-debug snoop request is received in response to a transaction snooped from a system interconnect. The non-debug snoop request is stored into a second entry of the snoop request queue and a second debug indicator is set corresponding to the second entry to a second value. The first value is different from the second value. The first value indicates a debug type snoop request and the second value indicates a non-debug type snoop request. The debug snoop request is provided to a cache for processing when the debug snoop request is at a head of the snoop request queue. The non-debug snoop request is provided to the cache for processing when the non-debug snoop request is at the head of the snoop request queue. In another form the receipt of the debug snoop request in response to the debug snoop command from the debugger is performed without use of the system interconnect. In another form a trigger signal is asserted in response to occurrence of a specified debug event, wherein the storing the debug snoop request into the first entry of the snoop request queue is performed in response to the asserting the trigger signal. In yet another form a trigger signal is asserted in response to occurrence of a specified debug event. The debug snoop request is provided to the cache for processing when the debug snoop request is at the head of the snoop request queue and is performed when the debug snoop request is at the head of the snoop request queue and the trigger signal is asserted. In another form a debug snoop status corresponding to the debug snoop request is provided after the debug snoop request has been processed by the cache. A non-debug snoop status corresponding to the non-debug snoop request is provided after the non-debug snoop request has been processed by the cache. In another form the debug snoop status is provided by using the first debug indicator to route the debug snoop status to the debugger. The non-debug snoop status is provided by using the second debug indicator to route the non-debug snoop status to the system interconnect. In yet another form prior to storing the debug snoop request into the first entry of the snoop request queue, the debug snoop request is buffered and at least one additional debug snoop request is buffered, wherein storing the debug snoop request into the first entry of the snoop request queue is performed in response to a number of currently buffered debug snoop requests reaching a threshold value.

In yet another form there is provided a data processing system having snoop circuitry having a snoop request queue. The snoop request queue has a plurality of entries, each of the plurality of entries stores a snoop request, wherein each snoop request can either be a debug snoop request or a non-debug snoop request. A debug indicator corresponds to each snoop request which indicates whether the snoop request is a debug snoop request or a non-debug snoop request. The snoop circuitry receives non-debug snoop requests for storage into the snoop request queue in response to transactions snooped from a system interconnect and receives debug snoop requests from debug circuitry for storage into the snoop request queue in response to debug snoop commands. A cache receives non-debug snoop requests and debug snoop requests from the snoop request queue for processing. In another form the snoop circuitry, in response to the cache processing a snoop request from the snoop request queue to form a processed snoop request, uses the debug indicator corresponding to the processed snoop request to route a snoop response corresponding to the processed snoop request to either the debug circuitry or the system interconnect based on whether the processed snoop request is either a debug snoop request or a non-debug snoop request, respectively. In yet another form, trigger control logic provides a first trigger signal in response to occurrence of a specified debug event to indicate when a debug snoop request is to be provided from the debug circuitry for storage into the snoop request queue.

In another form there is provided a data processing system having a cache which receives non-debug snoop requests and debug snoop requests for processing. The non-debug snoop requests are generated in response to transactions snooped from a system interconnect. Debug control circuitry provides the debug snoop requests to the cache for processing, wherein the debug snoop requests are generated in response to debug snoop commands from a debugger and without use of the system interconnect Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 10, for example, from computer readable media such as the memory or other media on other computer systems. Such computer readable media may be permanently, removably or remotely coupled to an information processing system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the invention is described herein with reference to specific embodiments, various modifications and changes can be made without departing from the scope of the present invention as set forth in the claims below. For example, the external debugger 9 may be implemented either wholly or partially on a same integrated circuit or same printed circuit board that contains data processing system 10. Various trigger events may be used by the trigger control logic 43, such as breakpoints or other processing exceptions. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A data processing system comprising:
   a cache;
   snoop circuitry having a snoop request queue which stores non-debug snoop requests and debug snoop requests, wherein the snoop circuitry receives the non-debug snoop requests in response to transactions snooped from a system interconnect and receives the debug snoop requests in response to debug snoop commands from a debugger, and wherein the snoop circuitry provides the non-debug snoop requests and the debug snoop requests from the snoop request queue to the cache, wherein the snoop request queue includes a plurality of entries, each entry for storing a request, wherein each request can either be a non-debug snoop request or a debug snoop request, and wherein the snoop circuitry includes, for each request stored the snoop request queue, a debug indicator which indicates whether the request is a non-debug snoop request or a debug snoop request; and
   debug control circuitry which provides the debug snoop requests in response to the debug snoop commands to the snoop circuitry for storage into the snoop request queue.

2. The data processing system of claim 1, wherein the debug snoop requests are provided to the snoop request queue in response to the debug snoop commands without use of the system interconnect.

3. The data processing system of claim 1, wherein the debug snoop requests are provided to the snoop request queue in response to the debug snoop commands without placing the data processing system in a halted mode.

4. The data processing system of claim 1, wherein the snoop circuitry, in response to a processed request formed by the cache processing a request from the snoop request queue, uses the debug indicator corresponding to the processed request to route a snoop response corresponding to the processed request to either the debug control circuitry or the system interconnect.

5. The data processing system of claim 1, wherein the snoop circuitry, in response to the cache processing a debug snoop request from the snoop request queue, provides a corresponding debug snoop response to the debug control circuitry and, in response to the cache processing a non-debug snoop request from the snoop request queue, provides a corresponding non-debug snoop response to the system interconnect.

6. The data processing system of claim 1, wherein the trigger control logic provides a second trigger signal to indicate when a debug snoop request at a head of the snoop request queue is to be provided to the cache for processing.

7. The data processing system of claim 1, wherein the trigger control logic provides the first trigger signal in response to occurrence of a specified debug event.

8. The data processing system of claim 1, further comprising:
   trigger control logic which provides a first trigger signal to indicate when a debug snoop request is to be provided from the debug control circuitry for storage into the snoop request queue.

9. In a data processing system, a method comprising:
   receiving a debug snoop request in response to a debug snoop command from a debugger;
   storing the debug snoop request into a first entry of a snoop request queue and setting a first debug indicator corresponding to the first entry to a first value;
   receiving a non-debug snoop request in response to a transaction snooped from a system interconnect;
   storing the non-debug snoop request into a second entry of the snoop request queue and setting a second debug indicator corresponding to the second entry to a second value, wherein the first value is different from the second value, and wherein the first value indicates a debug type snoop request and the second value indicates a non-debug type snoop request;
   providing the debug snoop request to a cache for processing when the debug snoop request is at a head of the snoop request queue; and
   providing the non-debug snoop request to the cache for processing when the non-debug snoop request is at the head of the snoop request queue.

10. The method of claim 9, wherein the receiving the debug snoop request in response to the debug snoop command from the debugger is performed without use of the system interconnect.

11. The method of claim 9, further comprising:
    asserting a trigger signal in response to occurrence of a specified debug event, wherein the providing the debug snoop request to the cache for processing when the debug snoop request is at the head of the snoop request queue is performed such that debug snoop request is provided to the cache for processing when the debug snoop request is at the head of the snoop request queue and the trigger signal is asserted.

12. The method of claim 9, further comprising:
    providing a debug snoop status corresponding to the debug snoop request after the debug snoop request has been processed by the cache; and
    providing a non-debug snoop status corresponding to the non-debug snoop request after the non-debug snoop request has been processed by the cache.

13. The method of claim 12, wherein the providing the debug snoop status comprises using the first debug indicator to route the debug snoop status to the debugger, and wherein the providing the non-debug snoop status comprises using the second debug indicator to route the non-debug snoop status to the system interconnect.

14. The method of claim 9, further comprising:
prior to the storing the debug snoop request into the first entry of the snoop request queue, buffering the debug snoop request and buffering at least one additional debug snoop request,
wherein the storing the debug snoop request into the first entry of the snoop request queue is performed in response to a number of currently buffered debug snoop requests reaching a threshold value.

15. The method of claim 9, further comprising:
asserting a trigger signal in response to occurrence of a specified debug event, wherein the storing the debug snoop request into the first entry of the snoop request queue is performed in response to the asserting the trigger signal.

16. A data processing system comprising:
snoop circuitry having a snoop request queue, wherein the snoop request queue comprises:
    a plurality of entries, each of the plurality of entries for storing a snoop request, wherein each snoop request can either be a debug snoop request or a non-debug snoop request, and
    a debug indicator, for each request stored the snoop request queue, which indicates whether the request is a non-debug snoop request or a debug snoop request,
wherein the snoop circuitry receives non-debug snoop requests for storage into the snoop request queue in response to transactions snooped from a system interconnect and receives debug snoop requests from debug circuitry for storage into the snoop request queue in response to debug snoop commands; and
a cache which receives non-debug snoop requests and debug snoop requests from the snoop request queue for processing.

17. The data processing system of claim 16, wherein the snoop circuitry, in response to the cache processing a snoop request from the snoop request queue to form a processed snoop request, uses the debug indicator corresponding to the processed snoop request to route a snoop response corresponding to the processed snoop request to either the debug circuitry or the system interconnect based on whether the processed snoop request is either a debug snoop request or a non-debug snoop request, respectively.

18. The data processing system of claim 16, further comprising:
trigger control logic which provides a first trigger signal in response to occurrence of a specified debug event to indicate when a debug snoop request is to be provided from the debug circuitry for storage into the snoop request queue.

\* \* \* \* \*